(12) United States Patent
Bryde (10) Patent No.: US 6,542,587 B1
(45) Date of Patent: Apr. 1, 2003

(54) PRELIMINARY COMMUNICATION IDENTIFICATION

(75) Inventor: Melanie Bryde, San Diego, CA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/408,640

(22) Filed: Sep. 30, 1999

(51) Int. Cl.$^7$ .............................................. H04M 11/00
(52) U.S. Cl. ................................................ 379/93.23
(58) Field of Search ........................... 379/93.23, 93.17, 379/142.01, 142.06, 142.15, 142.16, 142.17; 348/14.01

(56) References Cited

U.S. PATENT DOCUMENTS

| | | | |
|---|---|---|---|
| 5,559,868 A | 9/1996 | Blonder | 379/96 |
| 5,574,778 A | 11/1996 | Ely et al. | 379/207 |
| 5,574,779 A | 11/1996 | Ely et al. | 379/207 |
| 5,583,927 A | 12/1996 | Ely et al. | 379/207 |
| 5,778,056 A | 7/1998 | Ely et al. | 379/207 |
| 5,796,424 A | 8/1998 | Ely et al. | 348/15 |
| 5,875,239 A * | 2/1999 | Koralewski et al. | 379/93.23 |
| 5,907,604 A | 5/1999 | Hsu | 379/142 |
| 6,061,434 A * | 5/2000 | Corbett | 379/93.23 |
| 6,310,944 B1 * | 10/2001 | Brisebois et al. | 379/93.23 |

* cited by examiner

Primary Examiner—Stella Woo
(74) Attorney, Agent, or Firm—Scott Charles Richardson (57) ABSTRACT

An apparatus and method for preliminary communication identification is disclosed. An apparatus for preliminary communication identification includes a receiver for receiving a signal from a remote source and a communicator for communicating the received signal. The communicator is suitable for communicating the received signal without indicating reception of the received signal to the remote source. The signal may include an image of a second user utilizing the remote source so as to enable a first user utilizing the apparatus to view the remote second user. A method for preliminary communication identification is also disclosed, including receiving a signal by a host system from a remote source and communicating the signal by the host. The signal is suitable for being communicated without indicating reception of the signal by the host to the remote source.

38 Claims, 8 Drawing Sheets

PRELIMINARY COMMUNICATION IDENTIFICATION

FIELD OF THE INVENTION

The present invention generally relates to the field of communication, and particularly to preliminary communication identification.

BACKGROUND OF THE INVENTION

With the increase of marketers utilizing direct communications, such as telemarketers, devices capable of identifying an incoming communication to enable a user to determine whether to accept a communication have become increasingly more popular. Previous methods of identification rely on specific information embedded in the signal to display information related to that call. For example, in a traditional "caller id" method a second signal is embedded in the first signal to display where the call originated and the originating caller's number. In another method, the data must be embedded within the signal to display the relevant identification data. There are numerous problems with these methods. First, the signal does not actually identify the originating caller, rather the signal identifies the source. Therefore, a user receiving a call cannot be certain as to who is actually calling them. Second, additional information must be embedded in the signal to even provide this information. Therefore, it would be useful to provide a method for preliminary communication identification wherein an embedded signal is not needed to identify the originating user and the actual user is identified, not simply where the call originated.

Typically, in a system of communication between a remote source and a local host, a connection is established before the transmission of data. For example, a connection may be initiated by a remote source transmitting a signal. The signal is received by the host after which the remote source and the host determine a common mode of operation. Determining a common mode of operation may include the process known as handshaking and negotiating protocols. After determining a common mode of operation, both the remote source and the host send signals, thereby actively communicating from the host to the remote source. Even if an identification system is utilized, both systems are already in contact. It is at this point, once both the remote source and the local host are aware of the connection that the communication of data is begun so as to enable identification data to be displayed. The signal may include caller identification information such as the originating source of the call and number to enable a user to determine whether to accept the call. Utilizing this method, a caller determines whether to accept the call based upon additional information contained in the data that identifies only the source of the call, and not the actual caller. Furthermore, the host is in contact with the remote source before identification data has been utilized so as to indicate to the remote source the reception of the signal by the host.

Additionally, technological advances have made possible the utilization of video images along with audio data for communication between two or more parties. Video conferencing equipment, video phones, and the like allow users to actually see the person as they communicate. The numerous benefits of these systems are readily apparent. However, as such systems become more common place, traditional methods of identification of the initiating party may prove inadequate. A user is unable to determine the actual identity of the initiating party without allowing the initiating party to know of the reception of the communication. Therefore, it may also prove useful to provide a system and method for preliminary communication identification wherein the signal is capable of being communicated without indicating to the remote source that the signal is being received.

SUMMARY OF THE INVENTION

The present invention is directed to an apparatus and method for preliminary communication identification. The apparatus for preliminary communication identification includes a receiver for receiving a signal from a remote source and a communicator for communicating the received signal. The communicator is capable of communicating the received signal without indicating reception of the received signal to the remote source. The signal may include an image of a second user utilizing the remote source so as to enable a first user utilizing the apparatus to view the remote second user.

The present invention is further directed to a method for preliminary communication identification, which includes receiving a signal by a host system from a remote source and communicating the signal by the host. The signal may communicated without indicating reception of the signal by the host to the remote source.

In an embodiment of the present invention, an apparatus and method may utilize the signal to preliminarily identify a communication. For example, instead of requiring the use of embedded data in a signal to display identification information, the actual signal may be communicated so a user may determine whether to accept the communication. In this way, a viewer may determine the actual content of a communication and not just the source of the communication. In another embodiment of the present invention, a standardized signal may be utilized for preliminary communication identification.

It is to be understood that both the forgoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 8, exemplary embodiments of the present invention for preliminary communication identification will be discussed. Preliminary communication identification is generally achieved between a host system and a remote source. In an exemplary embodiment, the host system and a remote source may include a video phone, video conferencing system, information handling system, convergence system, set-top box, digital information appliance, communication device, etc. A signal communicated between the host and remote source may include digital and analog data in any combination or standard as may be utilized by a person of ordinary skill in the art. Communication between the host and remote source may be accomplished over a network, which may include a local area network (LAN), wide area network (WAN), Internet, Internet service provider (ISP), World Wide Web, telephone line, satellite such as a digital satellite system (DSS), wireless such as a personal communication system (PCS) or any other network or combination of networks capable of communication between two or more devices that may be apparent to a person of ordinary skill in the art. It is understood that the specific order, or hierarchy, disclosed is an example. Based upon design preferences, it is understood that the specific order, or hierarchy, can be rearranged while remaining within the scope of the present invention. The attached method claims present elements of the various steps in a sample order, and are not meant to be limited to the specific order or hierarchy presented.

Figure 1:
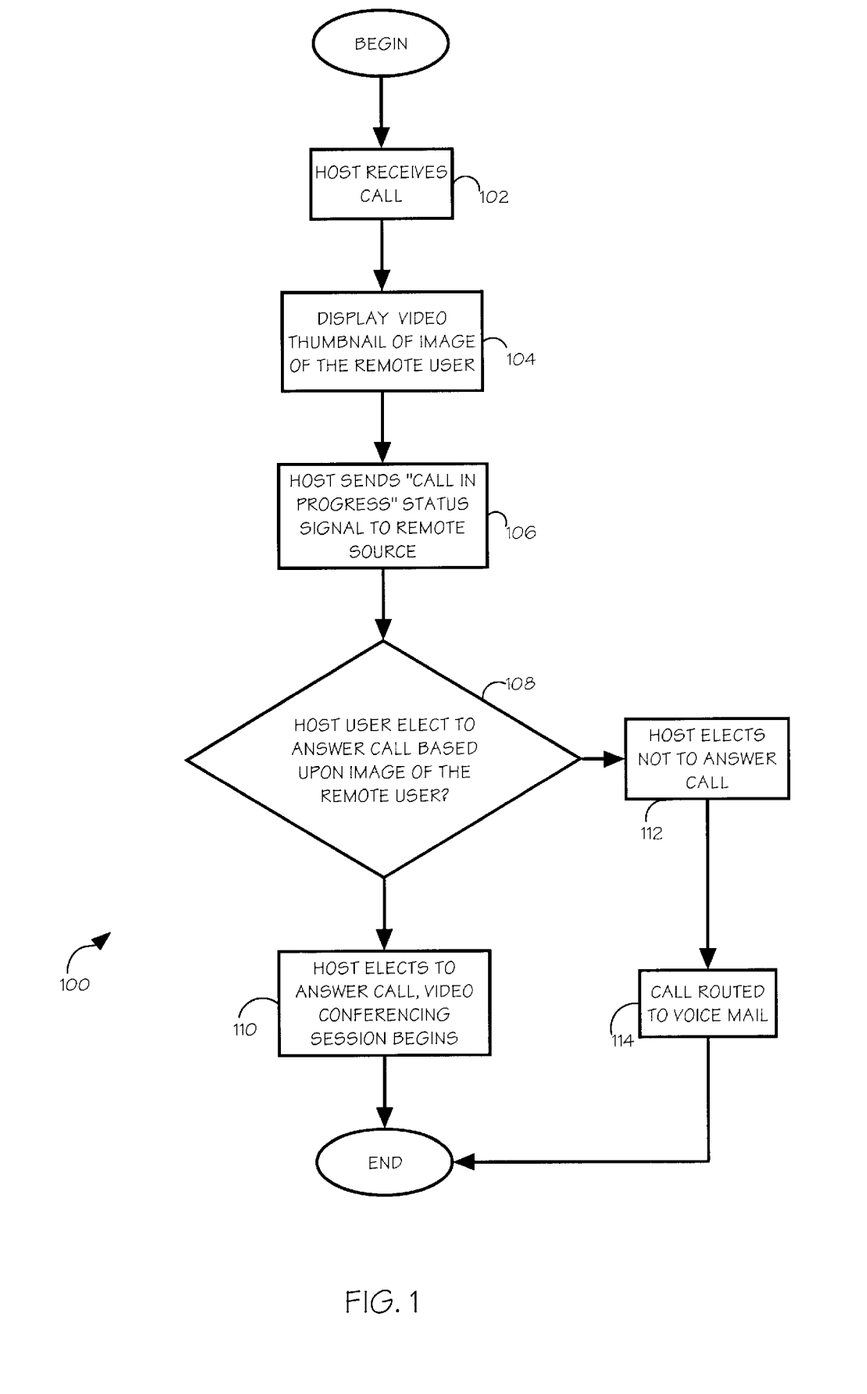
FIG. 1 is a flow diagram depicting a presently preferred embodiment of the present invention.

Referring now to FIG. 1, a presently preferred embodiment of preliminary communication identification 100 is shown. A user utilizing a host system including a video conferencing interface may receive a call 102. In response to the received call, a representation of the caller, such as a video thumbnail of the caller, may be displayed on the host system 104. While the representation is displayed, an equivalent of a "ring" signal on a conventional telephone system may be displayed, such as a "call-in-progress" status indicator, which may be sent to the remote source to indicate the status of the call 106. The user of the host system may then determine the identity of the remote source by utilizing an actual image of the source 108. The call recipient may elect to answer the call, in which case a two-way video conferencing session between the remote source and the user may begin 110. Alternatively, if the user elects not to answer the call 112, the calling party may be treated in a "call-not-answered" mode, such as continuing ring tones or forwarding to voice mail 114.

Referring now to FIGS. 2 through 7, exemplary methods of utilizing the present invention are shown. A variety of methods may be utilized to provide preliminary communication identification of a remote source before indicating reception of the signal by the host system. It is anticipated that by a person of ordinary skill in the art may utilize a variety of combinations and differing orders of steps in practicing the present invention and not depart from the spirit and scope thereof. The following embodiments are shown to describe examples as may be desirable in exemplary instances.

Figure 2:
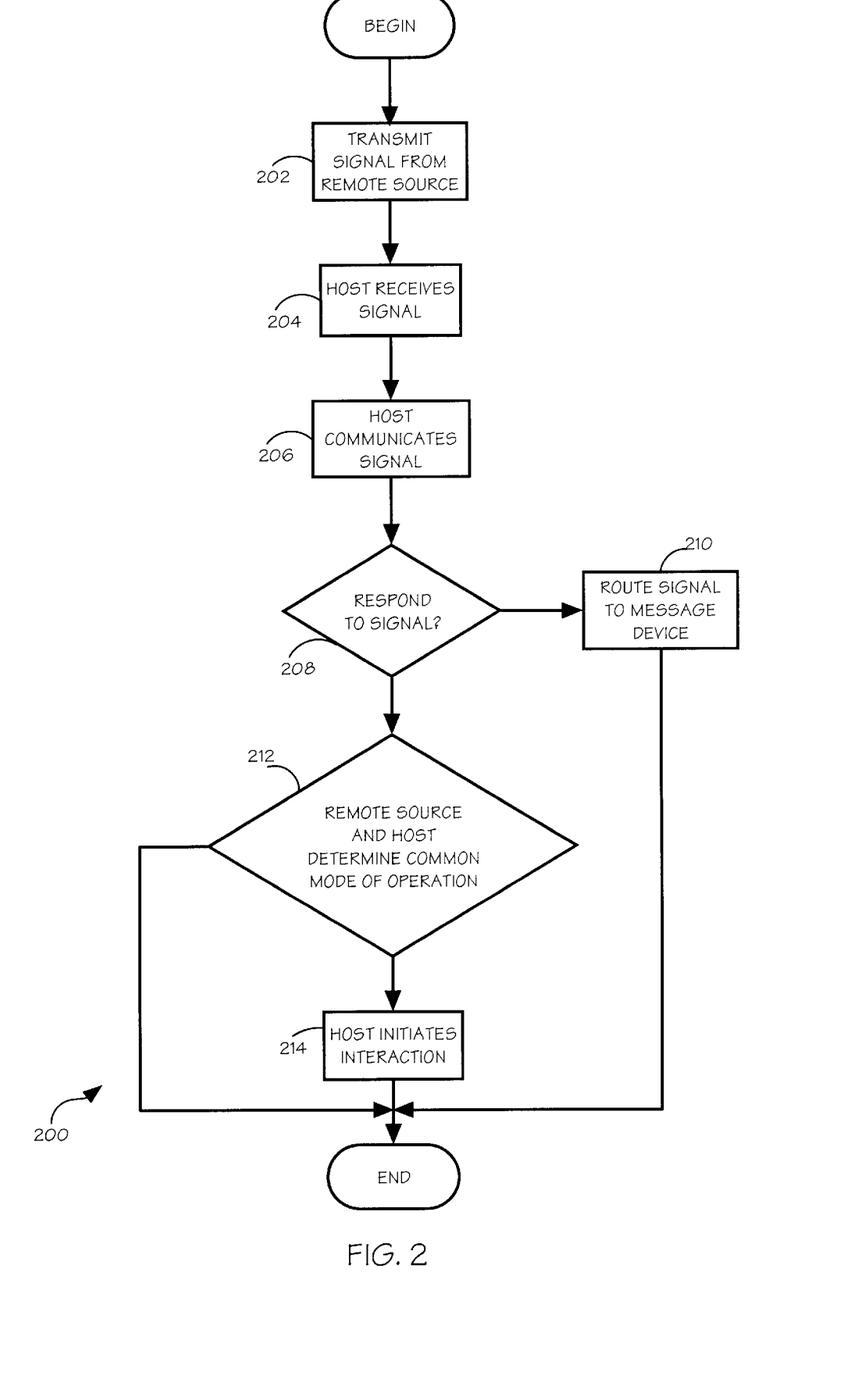
FIG. 2 is a flow diagram depicting an exemplary embodiment of the present invention wherein preliminary communication identification of a remote source is enabled before indicating to the remote source that the signal has been received.

Referring now to FIG. 2, an exemplary embodiment of the present invention is shown. The method 200 of preliminary communication identification is initiated by the transmittal of a signal by a remote source 202. A host receives the signal 204 and communicates the signal 206. For example, this signal may be communicated as an image of the user in a video conferencing system, shown in a window of an information handling system, a screen overlay, etc. A user may then determine whether to respond to the signal 208. If the user decides not to respond to the signal, the signal may be routed to a messaging device 210, such as an answering machine, recording device, etc. Additionally, an automatic system may be employed wherein the signal is routed based upon the type of signal being sent, such as video, audio, etc. or any other data contained in the signal. If the user decides to begin interaction with the signal, the remote source and host may then determine a common mode of operation 212, such as by negotiating protocols and connection rates. At this point, the user is ready to interact with the remote source 214 through the host. In this example, the user may determine whether to initiate interaction before the remote source is aware that a connection has been established. Indication to the remote source by the host may be accomplished at different points in the connection process, depending on the requirements of the connection.

Figure 3:
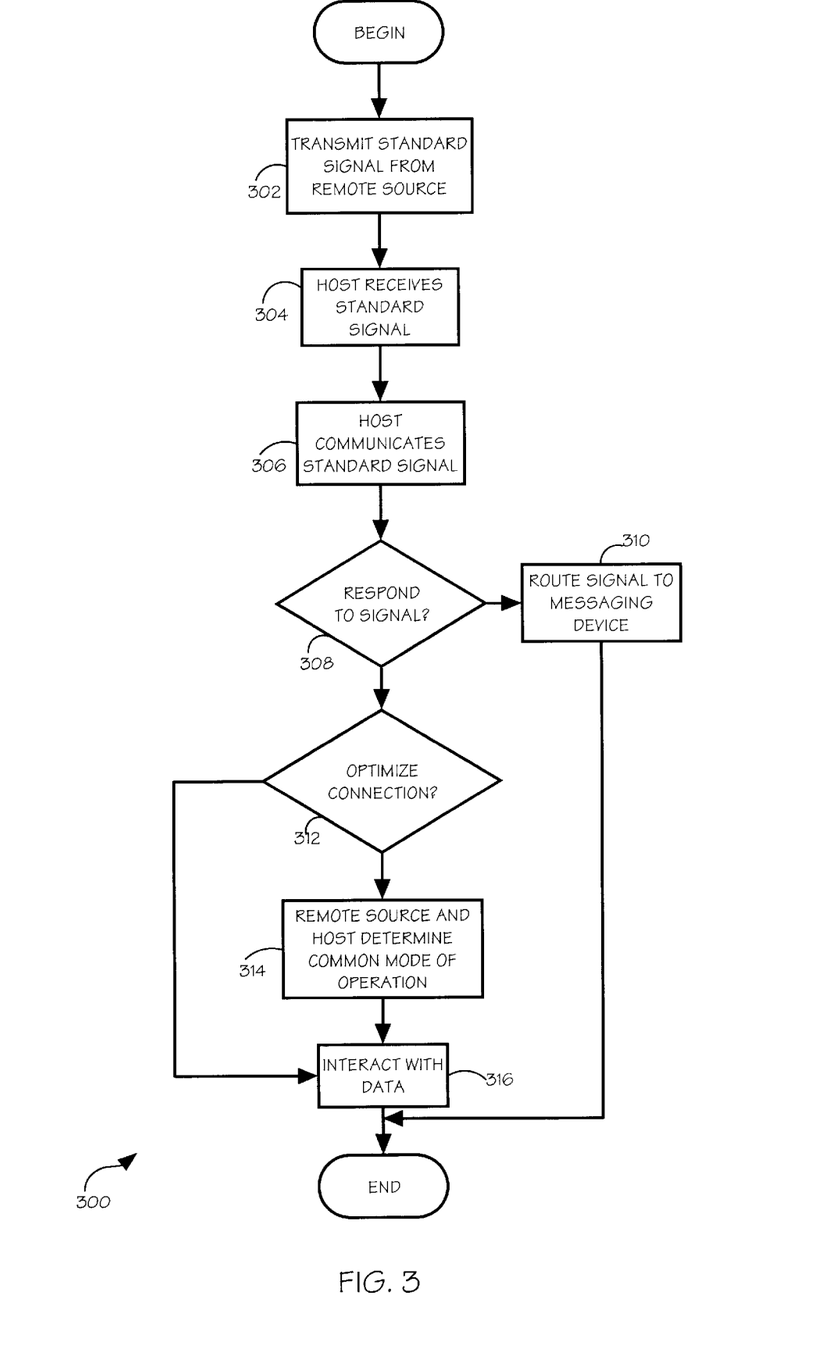
FIG. 3 is a flow diagram depicting an exemplary embodiment of the present invention wherein preliminary communication identification of a remote source is enabled by utilizing a standardized signal.

The present invention provides a variety of different methods of accomplishing preliminary communication identification before indicating to a remote source that the signal is being received. As shown in FIG. 3, an exemplary method of preliminary communication identification 300 may utilize a standardized signal from a remote source 302. After the host receives the standardized signal 304, the host may communicate the standardized signal 306 to a user. A standardized signal may include a signal that operates at a predetermined speed and/or protocol so as to enable communication without negotiating a connection. This way, the user may decide to respond to the signal 308, such as by viewing the contents of the signal. If the user decides not to respond to the signal, the signal may be routed to a messaging device 310. However, if the user decides to respond to the signal, the user may then decide whether to optimize the connection 312. For example, the standardized signal may not operate at the optimum settings at which the remote source may connect to the host. By optimizing the connection, the host and the remote source may interact in a maximized manner. After the remote source and the host determine a common mode of operation 314, the user may interact with the signal 315. By utilizing this example, the remote source is not aware that the signal is being received until after the user makes a determination of whether to accept the communication. This method may be preferable when various connection speeds and protocols may be utilized by a connection between a host and a remote source, such as over a modem connection.

Figure 4:
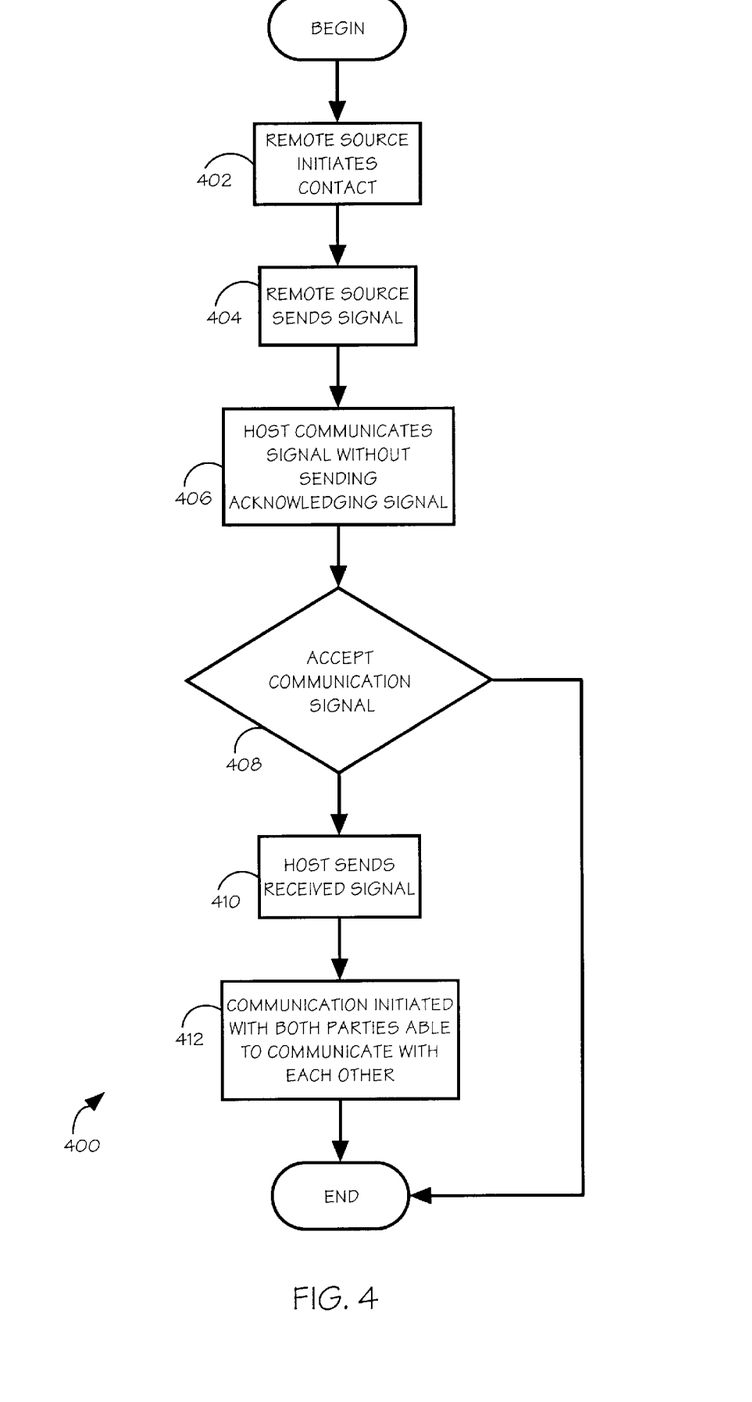
FIG. 4 is a flow diagram depicting an exemplary embodiment of the present invention wherein preliminary communication identification of a remote source is enabled by utilizing the content of the transmitted signal.

Additionally, in some instances the signal itself may be utilized directly for preliminary communication identification. Referring now to FIG. 4, an exemplary method 400 for preliminary communication identification is shown wherein the communication is a video conferencing signal. A remote source initiates contact with a host 402 at which time, the remote host sends a signal containing video conferencing data 404. The host then communicates the signal without sending an acknowledging signal 406. In this way, a user may determine whether to accept the communication signal 408 without indicating to the remote source that the signal is being received. Furthermore, by using the actual video conferencing signal, a user may determine the actual identity of the user of the remote source, instead of just determining where it originated. In this example, if the user decides to accept the signal, the host may send a signal indicating the reception of the signal 410 so as to initiate communication between the parties 412.

Figure 5:
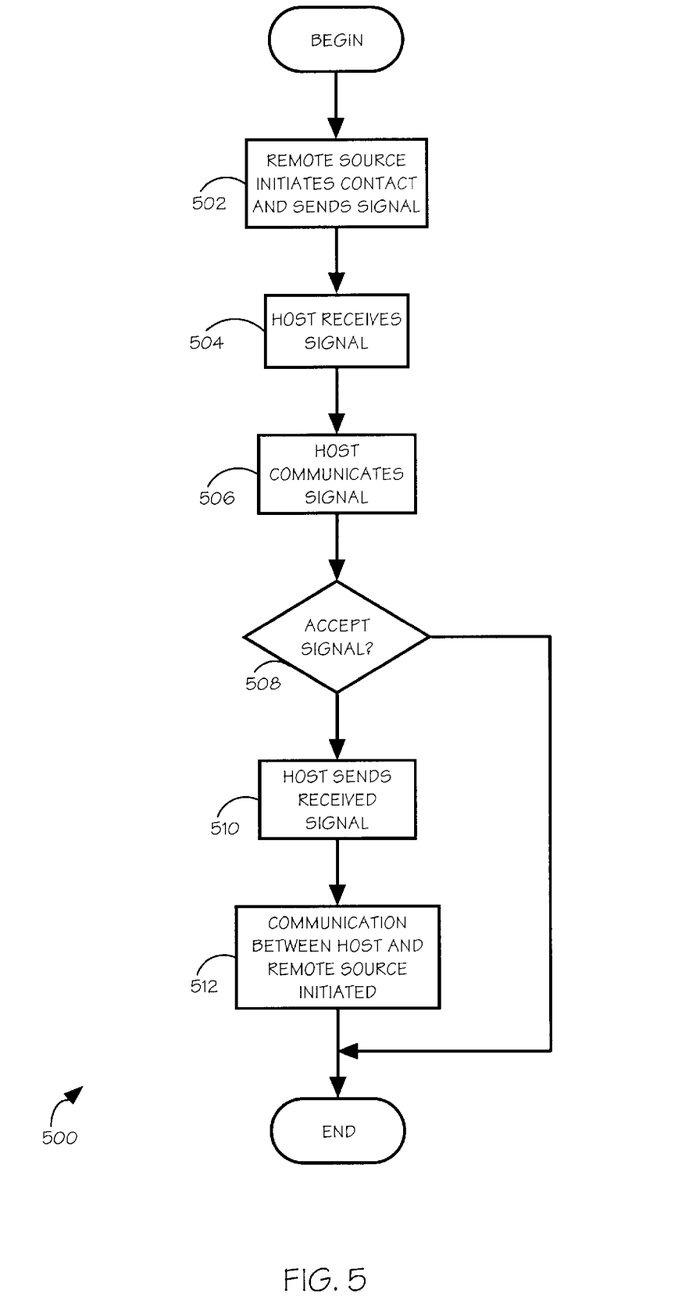
FIG. 5 is a flow diagram depicting an exemplary embodiment of the present invention wherein preliminary communication identification of a remote source is enabled without a determination of a common mode of operation.

Referring now to FIG. 5, yet another exemplary method 500 for preliminary communication identification is shown wherein a determination of a common mode of operation is not needed. It may be preferable to directly utilize data from a remote host for preliminary communication identification when there is no need to negotiate a connection between the host and a remote source. For example, such as when the remote source and the host are connected over the Internet, local area network (LAN), wide area network (WAN), etc. A remote source may initiate contact and send a signal 502. When the host system receives the signal, the signal is communicated 506 to a user without indicating to the remote source the reception of the signal. Therefore, a user may determine whether to accept the signal 508 and send a received signal 510 to begin communication between the host and the remote source 512. The user may alternately decide not to accept the signal wherein no reply is given to the remote source. In this way, a user may identify a remote source yet the remote source may not determine whether the signal was preliminarily communicated.

Figure 6:
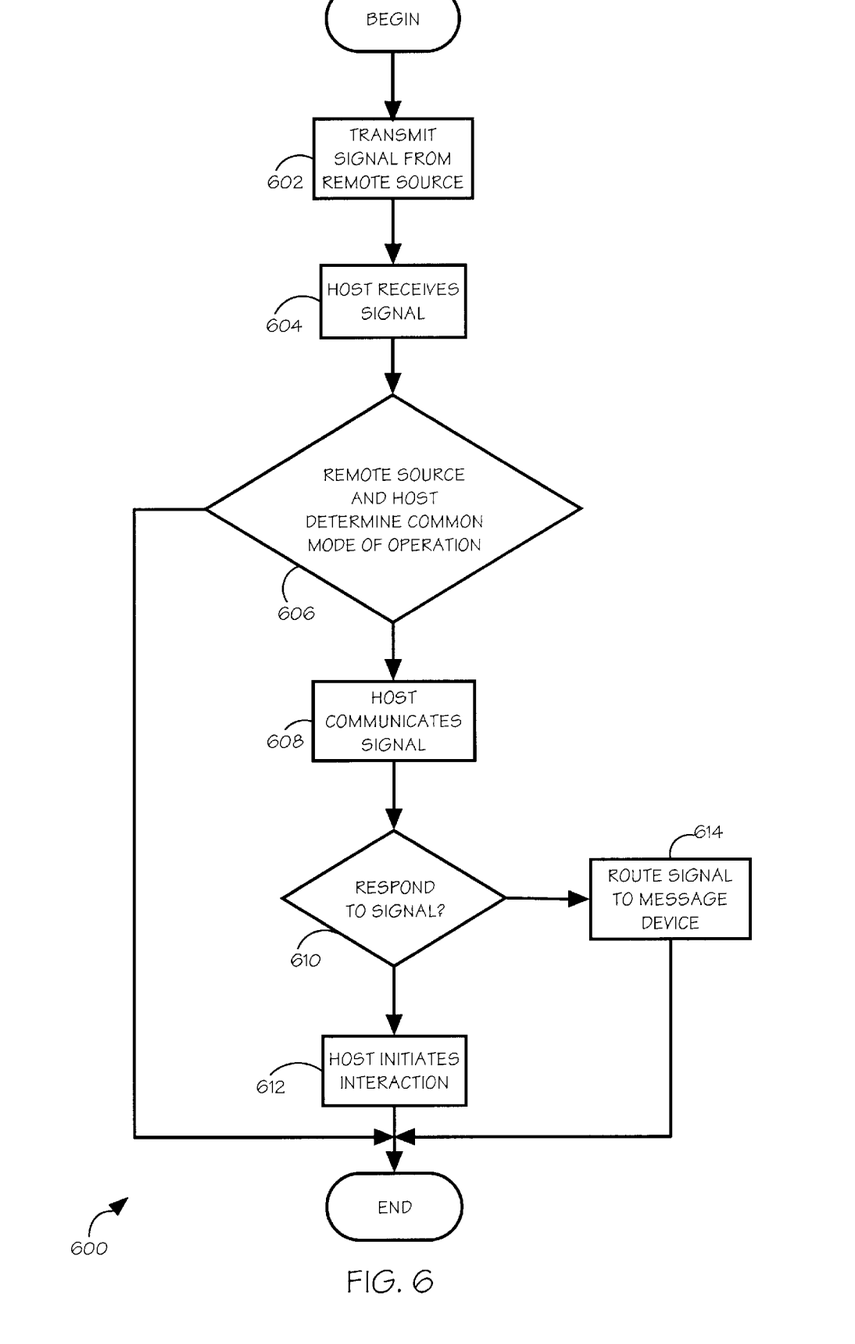
FIG. 6 is a flow diagram depicting an exemplary embodiment of the present invention wherein a common mode of operation is determined as an initial part of a preliminary communication identification.

As shown in FIG. 6, in some instances, it may be necessary to first determine a common mode of operation before preliminary communication may be achieved. In this method 600, a signal is first transmitted from a remote source 602 and received by the host 604. The host and the remote source then determine a common mode of operation 606, which may include connection speeds, protocols, etc. After the common mode of operation is established, the host communicates the signal 608 without sending a response signal to the remote source. A user may then determine whether to respond to the signal 610 and initiate interaction with the remote source 612 or route the signal to a message device 614. In this embodiment, even though a connection has been established, the signal from the remote source may be first communicated to the user by a host before initiating full contact with the remote source. Therefore, even though a connection has been established, the host has not indicated to the remote user that the signal is being received. For example, in a video conferencing network, an example of which is shown in FIG. 1, a host and a remote source may first determine a common mode of operation, such as negotiating connection speeds, protocols, etc. Once the connection is established the signal from the remote source may be communicated to the user so the user may view the originator of the video conferencing session. If the user wishes to respond to the signal, the user may then return video data so the remote source may then view the user. However, a user may wish to route the signal to a messaging device so as to respond to the remote source at a later time. In this example, it is only after the user of the host system has determined to accept the communication, by viewing the user of the remote source, that answering data was sent to the remote source to indicate reception of the signal.

Figure 7:
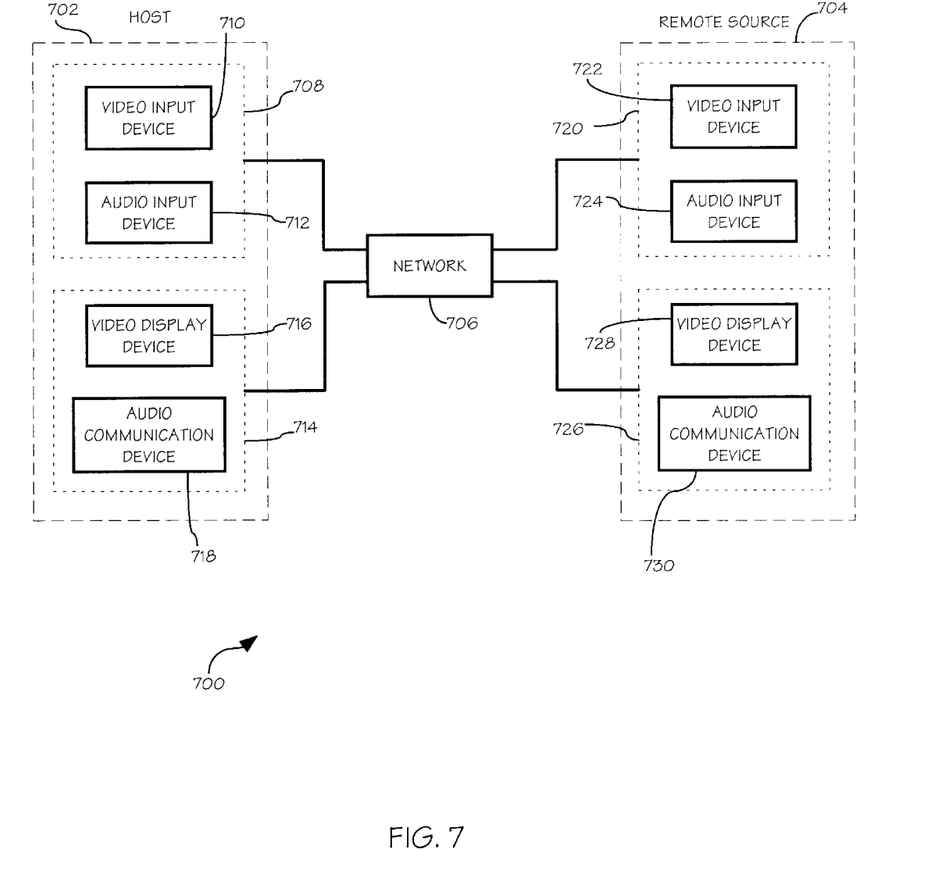
FIG. 7 is a block diagram depicting a network of video conferencing devices operable to employ to present invention.

Referring now to FIG. 7, a block diagram of an exemplary network system capable of being utilized for video conferencing is shown. In this embodiment, a host 702 and remote source 704 communicate over a network 706. The network may include Internet, network service provider, local area network (LAN), wide area network (WAN), telephone, etc. Typically, a host suitable for being utilized for video conferencing will include an input device 708 and an output device 714 for communicating with the remote source 704. An input device 708 may include a video-input device 710 for transmitting video data and an audio input device 712 for transmitting audio data. An output device 714 may include a video display device 716 for displaying video data and an audio communication device 718 for communicating audio data received from the remote source 704. Similarly, a remote source 704 may include an input device 720 including video 722 and audio 724 input devices and an output device 726 including video 728 and audio 730 communication devices.

Figure 8:
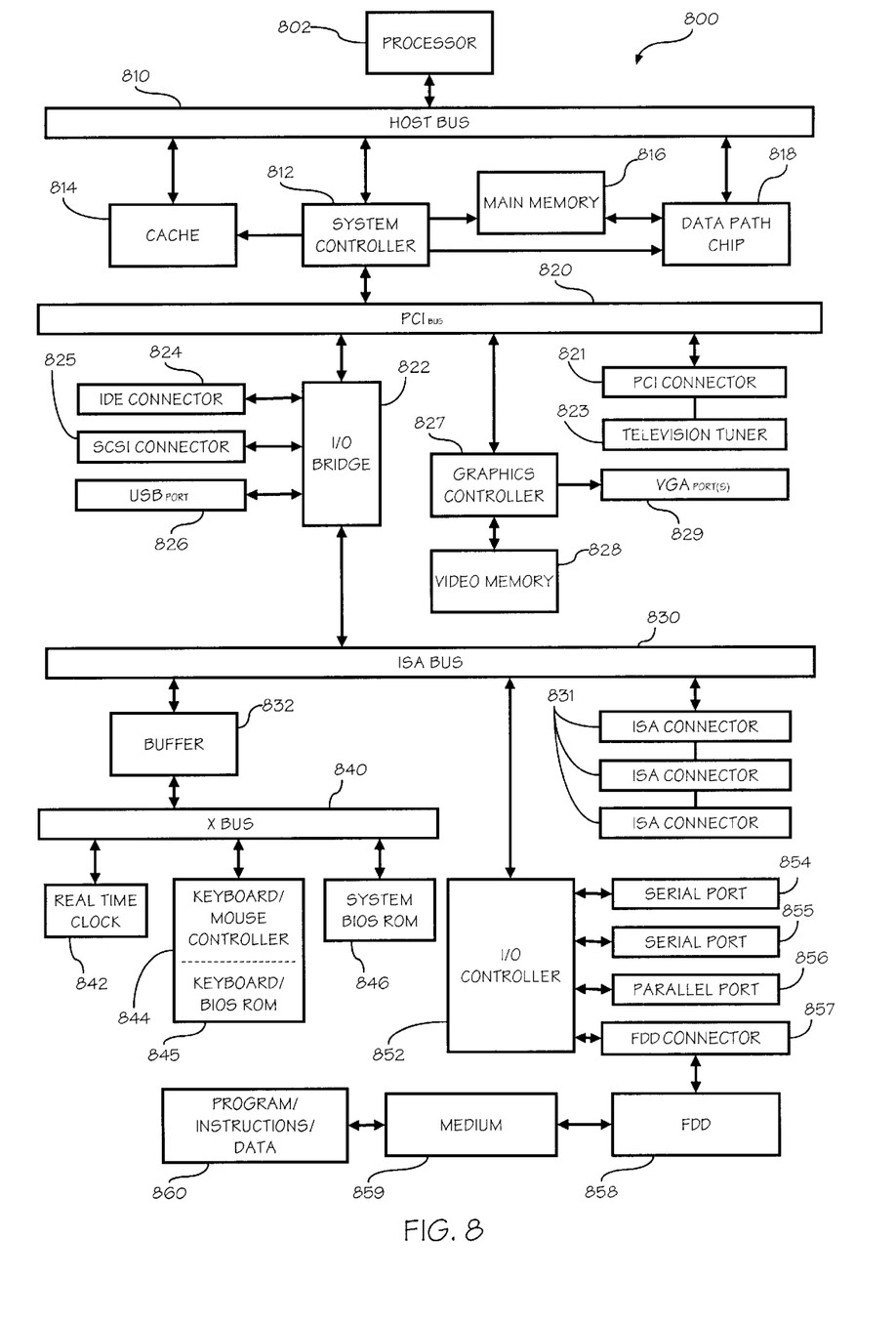
FIG. 8 is a block diagram of an information handling system operable to embody the present invention.

Referring now to FIG. 8, a block diagram of an exemplary information handling system 800 operable to employ the present invention is shown. In this embodiment, processor 802, system controller 812, cache 814, and data-path chip 818 are each coupled to host bus 810. Processor 802 is a microprocessor such as a 486-type chip, a Pentium®, Pentium II®, Pentium III® or other suitable microprocessor. Cache 814 provides high-speed local-memory data (in one embodiment, for example, 512 KB of data) for processor 802, and is controlled by system controller 812, which loads cache 814 with data that is expected to be used soon after the data is placed in cache 812 (i.e., in the near future). Main memory 816 is coupled between system controller 814 and data-path chip 818, and in one embodiment, provides random-access memory of between 16 MB and 128 MB of data. In one embodiment, main memory 816 is provided on SIMMS (Single In-line Memory Modules), while in another embodiment, main memory 816 is provided on DIMMs (Dual In-line Memory Modules), each of which plugs into suitable sockets provided on a motherboard holding many of the other components shown in FIG. 8. Main memory 816 includes standard DRAM (Dynamic Random-Access Memory), EDO (Extended Data Out) DRAM, SDRAM (Synchronous DRAM), or other suitable memory technology. System controller 812 controls PCI (Peripheral Component Interconnect) bus 820, a local bus for system 800 that provides a high-speed data path between processor 802 and various peripheral devices, such as video, disk, network, etc. System controller 812 to assist in routing data between main memory 816, host bus 810, and PCI bus 820 also controls data-path chip 818.

In one embodiment, PCI bus 820 provides a 32-bit-wide data path that runs at 33 MHZ. In another embodiment, PCI bus 820 provides a 64-bit-wide data path that runs at 33 MHZ. In yet other embodiments, PCI bus 820 provides 32-bit-wide or 64-bit-wide data paths that runs at higher speeds. In one embodiment, PCI bus 820 provides connectivity to I/O bridge 822, graphics controller 827, and one or more PCI connectors 821, each of which accepts a standard PCI card. In another embodiment, a television tuner 823 is included for viewing television signals. In yet another embodiment, I/O bridge 822 and graphics controller 827 are each integrated on the motherboard along with system controller 812, in order to avoid a board-connector-board signal-crossing interface and thus provide better speed and reliability. In the embodiment shown, graphics controller 827 is coupled to a video memory 828 (that includes memory such as DRAM, EDO DRAM, SDRAM, or VRAM (Video Random-Access Memory)), and drives VGA (Video Graphics Adaptor) port 829. VGA port 829 can connect to VGA-type or SVGA (Super VGA)-type displays. Other input/output (I/O) cards having a PCI interface can be plugged into PCI connectors 821.

In one embodiment, I/O bridge 822 is a chip that provides connection and control to one or more independent IDE connectors 824–825, to a USB (Universal Serial Bus) port 826, and to ISA (Industry Standard Architecture) bus 830. In this embodiment, IDE connector 824 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 824 are provided, and each provide the EIDE (Enhanced IDE) architecture. In the embodiment shown, SCSI (Small Computer System Interface) connector 825 provides connectivity for up to seven or fifteen SCSI-type devices (depending on the version of SCSI supported by the embodiment). In one embodiment, I/O bridge 822 provides ISA bus 830 having one or more ISA connectors 831 (in one embodiment, three connectors are provided). In one embodiment, ISA bus 1030 is coupled to I/O controller 852, which in turn provides connections to two serial ports 854 and 855, parallel port 856, and FDD (Floppy-Disk Drive) connector 857. In one embodiment, FDD connector 857 is connected to FDD 858 that receives removable media (floppy diskette) 859 on which are stored data and/or program code 860. In one such embodiment, program code 860 includes code that controls programmable system 800 to perform the method described below. In another such embodiment, serial port 854 is connectable to a computer network such as the Internet, and such network has program code 860 that controls programmable system 800 to perform the method described below. In one embodiment, ISA bus 830 is connected to buffer 832, which is connected to X bus 840, which provides connections to real-time clock 842, keyboard/mouse controller 844 and keyboard BIOS ROM (Basic Input/Output System Read-Only Memory) 1045, and to system BIOS ROM 846.

FIG. 8 shows one exemplary embodiment of the present invention, however other bus structures and memory arrangements are specifically contemplated.

In one embodiment, I/O bridge 822 is a chip that provides connection and control to one or more independent IDE connectors 824–825, to a USB (Universal Serial Bus) port 826, and to ISA (Industry Standard Architecture) bus 830. In this embodiment, IDE connector 824 provides connectivity for up to two standard IDE-type devices such as hard disk drives or CDROM (Compact Disk-Read-Only Memory) drives and similarly IDE connector 825 provides connectivity for up to two IDE-type devices. In one such embodiment, IDE connectors 824 and 825 each provide the EIDE (Enhanced IDE) architecture. In one embodiment, I/O bridge 822 provides ISA bus 830 having one or more ISA connectors 831 (in one embodiment, three connectors are provided). In one embodiment, ISA bus 830 is coupled to I/O controller 852, which in turn provides connections to two serial ports 854 and 855, parallel port 856, and FDD (Floppy-Disk Drive) connector 857. In one embodiment, ISA bus 830 is connected to buffer 832, which is connected to X bus 840, which provides connections to real-time clock 842, keyboard/mouse controller 844 and keyboard BIOS ROM (Basic Input/Output System Read-Only Memory) 845, and to system BIOS ROM 846.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 816 of one or more information handling systems configured generally as described in FIG. 8. Until required by the information handling system, the set of instructions may be stored in another readable memory device. For example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that preliminary communication identification of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus for preliminary communication identification, comprising:

a receiver for receiving a signal from a remote source, wherein the signal includes at least one of video conferencing data, digital data, and analog data;

a network connection for at least one of receiving and transmitting the signal from the remote source over a network connection, wherein the network connection includes at least one of a local area network (LAN), wide area network (WAN), Internet, Internet service provider (ISP), World Wide Web, telephone line, satellite system, and wireless system; and     a router for routing the signal, wherein the router routes the signal based upon at least one of user input, type of signal, and data contained in the signal;

a communicator for communicating the received signal;

wherein the communicator is suitable for communicating the received signal without indicating reception of the received signal to the remote source; and     wherein the signal includes an image of a second user utilizing the remote source so as to enable a first user utilizing the apparatus to view the remote second user.

2. The apparatus as described in claim 1, wherein a first user utilizing the apparatus may decide whether to interact with the signal based upon the communication of the signal including an image of a remote second user.

3. The apparatus as described in claim 1, wherein the receiver CV) determines a common mode of operation to enable a connection between a host and the remote source.

4. The apparatus as described in claim 1, wherein the signal is standardized.

5. The apparatus as described in claim 1, wherein the receiver optimizes a connection between the host system and the remote source.

6. The apparatus as described in claim 1, further comprising a network connection for at least one of receiving and transmitting the signal from the remote source over a network connection.

7. A method for preliminary communication identification, comprising:
- receiving, over a network connection, a signal by a host system from a remote source, wherein the signal is standardized and includes at least one of video conferencing data, digital data, and analog data;
- communicating the received signal by the host system;
- optimizing a connection between the host system and the remote source;
- wherein the received signal is suitable for being communicated without indicating reception of the received signal by the host to the remote source;
- wherein the signal includes an image of a second user utilizing the remote source so as to enable a first user utilizing the host system to view the remote second user; and
- wherein a first user may decide whether to interact with the signal based upon the communication of the signal including an image of a remote second user.

8. The method as described in claim 7, further comprising determining a common mode of operation to enable a connection between the host and the remote source.

9. The method as described in claim 7, wherein the network connection includes at least one of a local area network (LAN), wide area network (WAN), Internet, Internet service provider (ISP), World Wide Web, telephone line, satellite system, and wireless system.

10. The method as described in claim 7, further comprising routing the signal.

11. The method as described in claim 10, wherein the signal is routed based upon at least one of user input, type of signal, and data contained in the signal.

12. The method as described in claim 7, wherein the first user may decide whether to interact is further based upon a result of the step of optimizing the connection.

13. A program of instructions storable on a medium readable by an information handling system for causing the information handling system to execute steps for preliminary communication identification, the steps comprising:
- receiving, over a network connection, a signal by the information handling system from a remote source, wherein the signal is standardized and includes at least one of video conferencing data, digital data, and analog data;
- communicating the received signal by the information handling system;
- optimizing a connection between the host system and the remote source;
- wherein the received signal is suitable for being communicated without indicating reception of the received signal by the information handling system to the remote source;
- wherein the signal includes an image of a second user utilizing the remote source so as to enable a first user utilizing the information handling system to view the remote second user; and
- wherein a first user may decide whether to interact with the signal based upon the communication of the signal including an image of a remote second user.

14. The program of instructions as described in claim 13, further comprising determining a common mode of operation to enable a connection between the information handling system and the remote source.

15. The program of instructions as described in claim 13, wherein the network connection includes at least one of a local area network (LAN), wide area network (WAN), Internet, Internet service provider (ISP), World Wide Web, telephone line, satellite system, and wireless system.

16. The program of instructions as described in claim 13, further comprising routing the signal.

17. The program of instructions as described in claim 16, wherein the signal is routed based upon at least one of user input, type of signal, and data contained in the signal.

18. The program of instructions as described in claim 13, wherein the first user may decide whether to interact is further based upon a result of the step of optimizing the connection.

19. An information handling system, comprising:
- a processor for executing a program of instructions on the information handling system;
- a memory coupled to the processor for storing the program of instructions executable by said processor; and
- an input and output system coupled to the processor for coupling the information handling system to a network wherein the program of instructions configures the information handling system to
- receive a signal from a remote source;
- communicate the received signal;
- wherein the received signal is suitable for being communicated without indicating reception of the received signal by the information handling system to the remote source wherein the signal includes an image of a second user utilizing the remote source so as to enable a first user utilizing the information handling system to view the remote second user.

20. The information handling system as described in claim 19, wherein a first user utilizing the information handling system may decide whether to interact with the signal based upon the communication of the signal including an image of a remote second user.

21. The information handling system as described in claim 19, further comprising determining a common mode of operation to enable a connection between the information handling system and the remote source.

22. The information handling system as described in claim 19, wherein the signal is standardized.

23. The information handling system as described in claim 19, further comprising optimizing a connection between the information handling system and the remote source.

24. The information handling system as described in claim 19, wherein the signal includes at least one of video conferencing data, digital data, and analog data.

25. The information handling system as described in claim 19, wherein the information handling system receives the signal from the remote source over the network.

26. The information handling system as described in claim 19, wherein the network includes at least one of a local area network (LAN), wide area network (WAN), Internet, Internet service provider (ISP), World Wide Web, telephone line, satellite system, and wireless system.

27. The information handling system as described in claim 19, further comprising routing the signal.

28. The information handling system as described in claim 27, wherein the signal is routed based upon at least one of user input, type of signal, and data contained in the signal.

29. An information handling system, comprising:

a processor for executing a program of instructions on the information handling system;

a memory coupled to the processor for storing the program of instructions executable by said processor; and an input and output system coupled to the processor for coupling the information handling system to a network wherein the program of instructions configures the information handling system to include means for receiving a signal from a remote source;

means for communicating the received signal;

wherein the received signal is suitable for being communicated without indicating reception of the received signal by the information handling system to the remote source, wherein the signal includes an image of a second user utilizing the remote source so as to enable a first user utilizing the information handling system to view the remote second user.

30. The information handling system as described in claim 29, wherein a first user utilizing the information handling system may decide whether to interact with the signal based upon the communication of the signal including an image of a remote second user.

31. The information handling system as described in claim 29, further comprising means for determining a common mode of operation to enable a connection between the information handling system and the remote source.

32. The information handling system as described in claim 29, wherein the signal is standardized.

33. The information handling system as described in claim 29, further comprising means for optimizing a connection between the information handling system and the remote source.

34. The information handling system as described in claim 29, wherein the signal includes at least one of video conferencing data, digital data, and analog data.

35. The information handling system as described in claim 29, wherein the information handling system receives the signal from a remote source over the network.

36. The information handling system as described in claim 35, wherein the network includes at least one of a local area network (LAN), wide area network (WAN), Internet, Internet service provider (ISP), World Wide Web, telephone line, satellite system, and wireless system.

37. The information handling system as described in claim 29, further comprising means for routing the signal.

38. The information handling system as described in claim 37, wherein the signal is routed based upon at least one of user input, type of signal, and data contained in the signal.

* * * * *